United States Patent [19]
Meckler

[11] Patent Number: 5,600,967
[45] Date of Patent: Feb. 11, 1997

[54] REFRIGERANT ENHANCER-ABSORBENT CONCENTRATOR AND TURBO-CHARGED ABSORPTION CHILLER

[76] Inventor: Milton Meckler, 930 20th St., Apt. 2, Santa Monica, Calif. 90403

[21] Appl. No.: 427,852

[22] Filed: Apr. 24, 1995

[51] Int. Cl.$^6$ .................................................. F25B 15/00
[52] U.S. Cl. ........................................... 62/476; 62/109
[58] Field of Search ....................... 62/101, 109, 476, 62/485

[56] References Cited

U.S. PATENT DOCUMENTS

| | | | |
|---|---|---|---|
| 4,171,624 | 10/1971 | Meckler et al. | 62/271 |
| 4,481,783 | 11/1984 | Pecz et al. | 62/101 |
| 4,505,133 | 3/1985 | Malewski et al. | 62/476 |
| 4,586,344 | 5/1986 | Lutz et al. | 62/101 |
| 4,877,080 | 10/1989 | Ryham | 165/2 |
| 5,295,371 | 3/1994 | Oonou et al. | 62/476 |
| 5,367,884 | 6/1993 | Phillips et al. | 62/101 |

Primary Examiner—William Doerrler
Attorney, Agent, or Firm—William H. Maxwell

[57] ABSTRACT

A unit of apparatus for reprocessing concentrated absorbent solution in a closed absorption chiller, for discharge of water refrigerant through an evaporator for heat-in effect from a heat distribution system, and discharge of said absorbent solution reconcentrated thereby for absorption of said water refrigerant after chilling and heat-out effect to a cooling tower, characterized by vapor compression from an evaporator followed by liquification by a condenser with heat transfer from the condenser into the evaporator, increasing solution concentration 1.1% and increased chilling capacity of 23%, with a 7.1% increased coefficient of performance, resulting in a 23% increase in chilling.

48 Claims, 7 Drawing Sheets

REFRIGERANT ENHANCER-ABSORBENT CONCENTRATOR AND TURBO-CHARGED ABSORPTION CHILLER

BACKGROUND OF THE INVENTION

This invention relates to Direct Fired Absorption (DFA) Chillers and provides Turbo-Charging for reconcentrating an absorbent solution of environmentally acceptable water refrigerant in an aqueous salt solution with Lithium-Bromide or the like, it being a general object of this invention to increase the efficiency of the absorption process, particularly in two stage apparatus having primary and secondary generators for concentrating the absorbent refrigerant-salt solution.

The thermal reaction of water refrigerant is to absorb a large amount of heat when changing from a liquid to a vapor, and conversely to release the same amount of heat when the thermal reaction is reversed. The significant difference between mechanical refrigeration and absorption refrigeration is in the refrigerant used. That is, the costly typical fluorinated hydrocarbon compounds required by vapor compression refrigeration are replaced by a far less costly water/absorbent salt solution. The water refrigerant (distilled) with a latent heat of vaporization of approximately 1,000 Btu/lb is stable, non-toxic and readily absorbed, and is easily separated in large volume during the absorption process.

Significantly, absorption refrigeration requires a second fluid, an absorbent such as and preferably lithium-bromide, which is a non-toxic salt that has high affinity for water. This high affinity of lithium-bromide for the water refrigerant minimizes the volume of water solution that is pumped per pound of refrigerant per se transferred between the absorber and the generator of the apparatus, and its boiling point is also substantially higher than that of the water refrigerant, thereby facilitating separation of the refrigerant from the absorbent salt in solution.

The absorbent's affinity for water refrigerant changes with the amount of refrigerant present in the solution. A "dilute" absorbent is one with a high concentration of water refrigerant, and therefore has little affinity for it, and termed a "weak" absorbent. Whereas a "dense" absorbent solution is one with a low concentration of water refrigerant, and therefore has a great affinity for it, and termed a "strong" solution. An "intermediate" absorbent solution is a partially re-concentrated solution with moderate affinity. And a "mixed" absorbent solution is a mixture of intermediate and strong solution.

Direct Fired Absorption (DFA) Chillers are well known but have not been widely used in the United States. The DFA concept is based upon traditional absorption principles, similar to the principles of conventional vapor compression refrigeration and very similar to the concept principles of absorption chillers heated with steam and hot water. The direct fired heat absorption concept uses the environmentally compatible combination of water and an absorbent, and substitutes a burner for the conventional steam/hot water generator and auxiliary boiler. Direct fired absorption enjoys high efficiency COP's of 0.9 to 1.1, compared to 0.68 to 1.1 for said conventional two stage steam and/or hot water absorption. Furthermore, the boiler is eliminated and a burner only is required, or as compared to vapor compression refrigeration the burner replaces a mechanical compressor.

Direct fired absorption refrigeration is initiated when higher pressure liquid refrigerant solution from a condenser is discharged through an expansion device and into a lower pressure evaporator and collects therein. Expansion and "flashing" of the refrigerant solution occurs and said liquid refrigerant is collected in the sump of the evaporator. There is also the transfer of heat into the collected and cooled refrigerant solution, from comparatively warm system water that is pumped through a cooling tower causing the collected refrigerant solution to evaporate and resulting in vapor that is transferred to an absorber where it is absorbed into the lithium bromide refrigerant solution. This process not only creates a low pressure in the absorber that draws a continuous flow of refrigerant from the evaporator to the absorber, but also causes the vapor to condense as it releases the heat of vaporization in the evaporator. This heat together with the heat of dilution produced as the refrigerant condensate mixes with the absorbent is transferred into the cooling tower water and is carried out of the absorber. The assimilation of water refrigerant dilutes the lithium-bromide refrigerant solution and reduces its affinity for refrigerant vapor. In order to sustain the refrigeration cycle the solution is then reconcentrated by continuously pumping the dilute refrigerant solution from the absorber to a generator where heat is applied to distill the water refrigerant from the absorbent. As the water refrigerant is removed by distillation, the reconcentrated lithium-bromide refrigerant solution is returned through the absorber and to the generator to resume the absorption process, while the liberated refrigerant vapor from the generator is transferred to the cooler condenser and returned to its liquid state as the cooling tower absorbs the heat of condensation carried by the vapor. The liquid's return from the generator to the expansion device completes the cycle.

It is an object of this invention to increase the volume of water refrigerant applied to the system water evaporator, and to simultaneously strengthen the absorbent salt solution applied to the absorber that shares enclosure space with said water system evaporator. In practice, the system water evaporator and said absorber are combined and referred to herein as an evaporator-absorber means that collects low temperature weak absorbent. Accordingly, I provide a unique enhancer-concentrator unit that characterizes this invention and functions to increase the volume of water refrigerant and to simultaneously concentrate the weak absorbent subject to heat absorption into cooling tower water. It is weak absorbent salt solution that is collected in the sump of the evaporator-absorber means, and which is recirculated for evaporation therein and which is then reprocessed by the enhancer-concentrator unit to increase the volume of the water refrigerant and to also strengthen the condition of the weak absorbent solution by concentrating it.

There are three basic types of double effect direct fired absorption systems, identified by their respective cooling solution flow cycles; namely, Series Flow, Parallel Flow and Reverse Flow. In each system the operating fluids are dilute (weak), intermediate, and concentrated (strong) lithium-bromide salt solutions, plus a refrigerant (water) vapor and liquid. The enhancer-concentrator unit of this invention is compatible with any one of the three basic types of system as it is employed in a closed weak absorbent circuit associated with the system water evaporator-absorber means, independent from either the first or second stage generator. However, heat energy is applied to said closed circuit from a strong absorbent generator. Accordingly, it is an object of this invention to provide an enhancer-concentrator unit for use with a system water evaporator-absorber means circuit of any one of the said three basic double effect direct fired absorption systems. The three basic systems are shown herein to provide chilled system water by operating in a refrigeration mode, however it is to be understood that this does not preclude providing hot water by operating in a heating mode when so required.

Direct fired absorption chillers are characterized by flow control means that reduce the pressure of strong absorbent solution produced by the regeneration that concentrates the lithium-bromide absorbent and vaporizes the water refrigerant. Reduction in pressure of the absorbent fluid is required for heat absorption and is usually accomplished by a flow control means in the form of an orifice, an expansion valve or pressure regulation device. Additionally however, it is an object of this invention to reduce and/or regulate the expansion of strong absorbent through the advantageous employment of work producing prime mover means for driving pump means used in the recirculation of absorbent solution to be separated into enhanced system water and concentrated absorbent solution in the enhancer-concentrator unit herein disclosed. It is another object of this invention to provide an energy recovery turbine as the prime mover means, operating on the strong absorbent pressure and simultaneously providing the pressure drop and expansion into weak absorbent for effecting the refrigeration function of the system.

SUMMARY OF THE INVENTION

This invention provides a refrigerant enhancement and absorbent concentrator unit that increases the efficiency of direct fired absorption chillers, in any one of the generally recognized types thereof, by increasing the volume of water refrigerant supplying the evaporator at the chilling coils and simultaneously concentrating the absorbent solution at the heat absorber that removes heat from the system for discharge at a cooling tower or the like. It is the chilling mode of operation with which this invention is concerned, it being a general object to provide a unit that is compatible with and acceptable to existent air conditioning systems of the type under consideration, in either a cooling mode or heating mode as the case may be, and particularly with double effect direct fired absorption chiller systems. The basic principles of direct fired absorption is the use of a fossil fuel burner that heats and thereby produces a strong absorbent solution of lithium-bromide and water, and distills therefrom a water vapor refrigerant that is condensed in an evaporator and thereby chills system water that is usefully circulated. The absorbent solution is weakened in the process and heat removed therefrom and eliminated by means of an absorber that transfers said heat to a cooling tower or the like. The enhancer-concentrator unit of the present invention is employed in circuit with said absorber to remove heat from the system and is adaptable to single or double effect systems. This adaptable unit can be retrofitted or constructed as a component in combination with any one of the aforementioned absorption chiller systems.

The foregoing and various other objects and features of this invention will be apparent and fully understood from the following detailed description of the typical preferred forms and applications thereof, throughout which reference is made to the accompanying drawings.

PREFERRED EMBODIMENT

This invention provides an Enhancer-Concentrator (EC) which is inserted into a direct fired absorption chiller system in order to enhance the refrigerant and to concentrate the absorbent liquid. The refrigerant is water (distilled) and the absorbent is a salt, preferably lithium-bromide, soluble in water. In a basic single effect absorption system, high pressure concentrated liquid absorbent from a generator passes through a metering device or pressure control and into a low pressure evaporator where it contacts the water tower, heat-out coil. The refrigerant is metered into the evaporator which cools the liquid refrigerant and the warmer system water causes the refrigerant to evaporate. The resulting refrigerant vapor is then exposed to the lithium-bromide solution in an absorber where it is absorbed due to a large vapor pressure differential between the liquid and the refrigerant vapor and which drives the vapor into solution. As the vapor is absorbed it releases the heat of vaporization acquired in the evaporator. And, this heat together with the heat of dilution is absorbed by coils and discharged by a cooling tower. The weak refrigerant rich solution is collected in a sump and is again processed by the generator which is direct fired and distills the solution to separately provide refrigerant vapor and a reconcentrated lithium-bromide and water solution ready for recycling. The vaporized refrigerant passes through a condenser and returns to the liquid state as the cooling tower water picks up the heat of condensation, and the liquid is collected in the sump and returned to the generator for distilling and reconcentration.

The enhancer-concentrator EC that I have provided involves an evaporator 10, a condenser 11, and a vapor compressor or blower pump 12, preferably incorporated in a single vessel 13, and all of which is inserted into the absorption chiller system to enhance the volume of refrigerant water and to further concentrate the absorbent solution. In carrying out this invention, the evaporator 10 receives cooled absorbent solution at reduced pressure from the metering device 14. For example, a 60% Lithium Bromide solution at 121° F. and which is charged into the closed upper chamber x of vessel 13 by means of a spray bar 15, whereby the previously reconcentrated absorbent solution is vaporized more fully. The blower compressor 12 draws off and compresses this additional refrigerant water vapor which is charged at increased pressure and temperature into the closed lower chamber z of condenser 11, the dome of which is a heat transfer wall y for the transfer of heat into the vapor within the upper chamber x of evaporator 10 (in vessel 13). For example, increased from 1.7424 p.s.i. to 1.9449 p.s.i. at 125° F. The lower vessel portions of the evaporator 10 and of the condenser 11 are liquid collection sumps for the collection of additional water refrigerant and of the further concentrated absorbent solution. The blower compressor 12 is driven by a prime mover, for the purpose of maintaining a negative pressure in the upper evaporator chamber x in which refrigerant water is removed prior to compression by means of the blower compressor 12, thereby causing evaporation at the heat transfer dome or wall y and concentration of absorbent solution delivered to line 17 and to spray bar 20 of the absorber A. For example, concentration of liquid absorbent solution is increased to 64% at a temperature raised 4° to 8° F. above that maintained in the upper chamber x. As a result, refrigerant water is evaporated from lower temperature dilute absorbent solution in chamber x, thereby allowing the blower compressor 12 to sustain a continuous rate of evaporation of refrigerant water vapor from chamber x and simultaneously concentrating the absorbent solution in chamber z.

Accordingly, there are two liquid supply lines 16 and 17 from the enhancer-concentrator EC, a refrigerant line 16 that discharges (as by means of spray bar 40) into the evaporator E of the absorption chiller system, and a sorbent liquid line 17 that discharges into the absorber A by means of spray bar 20 of the absorption chiller system.

The absorption chiller systems shown herein are double effect systems wherein there are two stages of refrigerant reconcentration of the absorbent solution, a direct fired first stage high temperature high pressure concentrator C1 and a second stage low pressure low temperature concentrator C2. The chilling cycle is driven directly as by a gas or oil burner (or indirect steam application) applied to the first stage concentrator C1 which generates refrigerant water vapor at a relatively higher temperature and pressure, and the heat of condensation is used to drive the second stage C2 operating at a lower temperature and pressure. Accordingly, the refrigerant mass is boiled out of solution in each of the two stages, thereby substantially increasing the net generation of refrigerant and cooling capability per unit of heat input. There are inefficiencies, it being accepted that a double effect system will have a COP of approximately 1.0 whereas a single effect system will have a COP of approximately 0.65. With this invention there is a 7.1% increase in the coefficient of performance (COP) that increases chilling approximately 23%, because the volume of useful refrigerant is increased to that extent (values are nominal).

Referring now to the drawings, each embodiment shown includes a first stage concentrator C1, a second stage concentrator C2, and an evaporator E and absorber A for transfering heat from system water into cooling tower water for discharge to outside atmosphere. The tower is indicated but not shown, nor is the system water distribution shown, both of which are state of the art.

The first stage concentrator C1 is comprised of a boiler 21 fired by a burner 22 with the products of combustion discharged through a stack 23. The heat of combustion is applied to the enclosed weakened refrigerant rich absorbent solution to boil off the liquid refrigerant as a water vapor collected in the header 24 of the boiler and transferred to the second stage concentrator C2 via line 25. The reconcentrated absorbent solution is delivered to the spray bar 20 of the absorption chiller system via line 26; from which line said absorbent solution is further reconcentrated by the enhancer-concentrator EC as hereinabove described.

The second stage concentrator C2 is comprised of a heat transfer coil 27 through which the refrigerant vapor from line 25 is passed, and refrigerant condenser coil 28 which condenses the refrigerant mass. The coil 27 and coil 28 are preferably incorporated in a single vessel 30 and share the same atmosphere therein. The heat transfer coil 27 is subjected to heat transfer from lower temperature weakened adsorbent solution from the sump of the absorber A. The condenser coil 28 is in the cooling tower water circuit that removes refrigerant heat of condensation from the chiller system. The refrigerant vapors are thereby combined and the pressure thereof reduced, and mixed vapors combined in the second stage are condensed by the cooling tower coil 28 therein and collected in a sump 31 for discharge into the evaporator E for heat transfer out of the system water. The weakened absorbent solution employed for condensation of refrigerant vapor in the second stage concentrator C2 is collected in a sump 31 for re-entry into the chiller system; which varies in the several embodiments shown as will be described.

The evaporator E and the absorber A are preferably incorporated in a single vessel 33 and share the same atmosphere therein. The above described spray bar 20 discharges liquid absorbent solution into the absorber A section of the vessel 33, while a liquid line 34 discharges second stage refrigerant into the evaporator E section within the vessel 33. The evaporator E section is characterized by a heat-in coil 35 in the system water circuit, while the absorber A section is characterized by a heat-out coil 36 in the cooling tower circuit. The sump 32 of the absorber A section collects weakened absorbent solution which is returned through the system by a pump 37. The sump 38 of the evaporator section collects liquid refrigerant that is recycled over the heat-in coil 35 by means of a pump 39 recirculating refrigerant water from a spray bar 40, Cooling tower water is circulated through the heat-out coil 36 and through the coil 28 of the second stage concentrator C2 by a pump 41, The system water is circulated by a pump 42.

Figure 1:
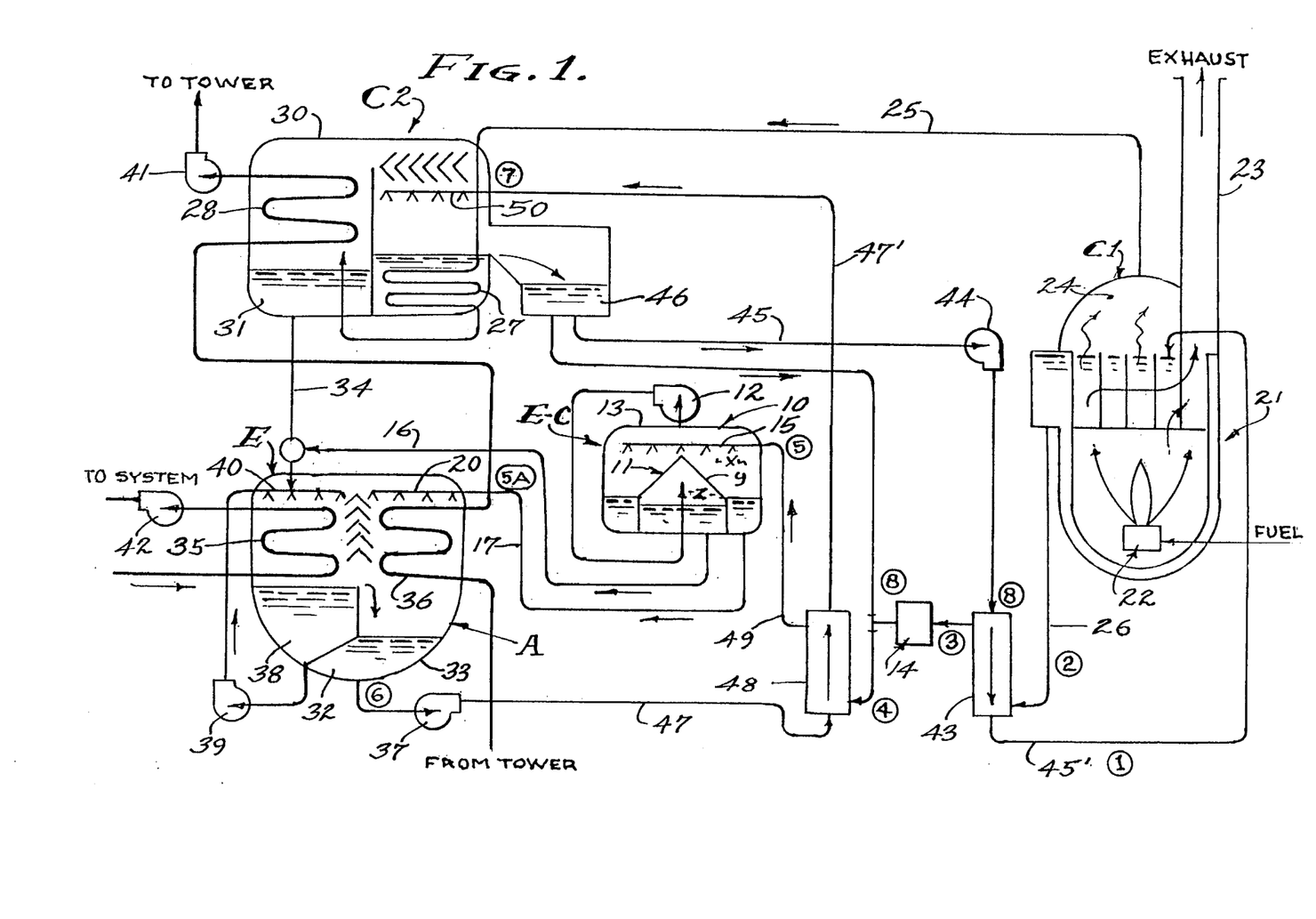
FIG. 1 is a schematic diagram of a reverse flow direct chilled absorption system and the enhancer-concentrator combined therein to improve the condition of the refrigerant and the absorbent.

Referring now to the reverse flow embodiment disclosed in FIG. 1 of the drawings, the absorption cycle begins when high temperature high pressure reconcentrated absorbent solution flows through the metering device 14 and is discharged by spray bar 20 into the lower pressure evaporator-absorber E-A vessel 33. The lower pressure causes boiling the refrigerant water from the absorbent solution, by "flashing" into vapor that cools the liquid solution mass. The warmer system water is pumped through coil 35 causing more refrigerant to vaporize, and the remaining refrigerant is collected in the sump 38 and recirculated over coil 35 by spray bar 40 to thereby evaporate more refrigerant. High temperature high pressure reconcentrated absorbent solution from the first stage concentrator C1 is delivered to the metering device 14 through a high temperature heat exchanger 43 that transfers heat into the return of weakened absorbent solution circulated by a pump 44 through a line 45 from the solution collector sump 46 of the second stage concentrator C2. A continuing line 45' feeds the pre-heated weakened solution into the header 24 of the first stage concentrator C1. Low temperature weakened absorbent solution is returned via line 47 through a low temperature heat exchanger 48 to further reduce the temperature of the low pressure solution released by the metering device 14, and it is this low temperature low pressure strong absorbent solution that is delivered through the enhancer-concentrator EC and to the evaporator-absorber EA via line 49 and 17. Line 4 discharges into the vessel 13 through the spray bar 15. And a continuing line 47' from line 47 through heat exchanger 48 discharges from a spray bar 50 into the vapor chamber generator section for heat transfer from coil 27. Accordingly, the volume of refrigerant is enhanced for delivery into the evaporator E, and the absorbent solution is strengthened for delivery into the absorber A, each of these functions increasing the chilling capability of the system.

Figure 2:
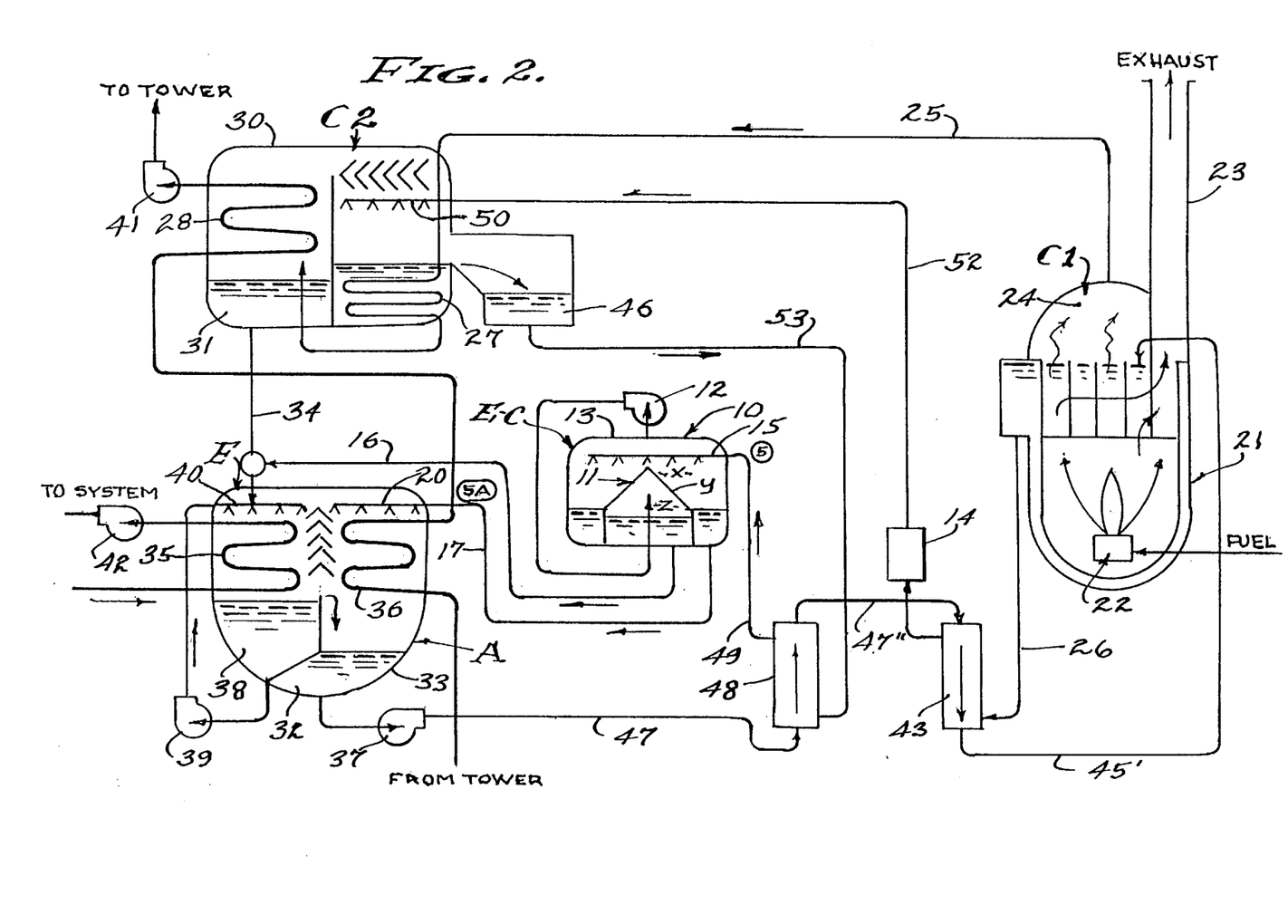
FIG. 2 is a schematic diagram of a series flow direct chilled absorption system and the enhancer-concentrator combined therein to improve the condition of the refrigerant and the absorbent.

Referring now to the series flow embodiment disclosed in FIG. 2 of the drawings, the absorption cycle begins when high temperature high pressure reconcentrated absorbent solution from the first stage concentrator C1 flows through the metering device 14 and through the second stage concentrator C2, and then discharged by spray bar 20 into the lower pressure evaporator-absorber E-A vessel 33. The lower pressure causes boiling of the refrigerant water from the absorbent solution, by "flashing" into vapor that cools the liquid solution mass. The warmer system water is pumped through coil 35 causing more refrigerant to vaporize, and the remainder water refrigerant is collected in the sump 38 and recirculated over coil 35 by spray bar 40 to thereby evaporate more refrigerant. High temperature high pressure reconcentrated absorbent solution from the first stage concentrator C1 is delivered to the metering device 14 through a high temperature heat exchanger 43 that transfers heat into the return of weakened absorbent solution recycled by pump 37 through line 47 and low temperature heat exchanger 48 to further reduce the temperature of the low pressure solution released by the metering device 14, and it is this low temperature low pressure strong absorbent solution that is delivered through the enhancer-concentrator EC and to the evaporator-absorber E-A via lines 49 and 17. Line 49 discharges into the vessel 13 through the spray bar 15. And a continuing line 47" from line 47 through the heat exchangers 48 and 43 discharges weakened absorbent solution pre-heated thereby into the header 24 of the concentrator C1 via the line 45'. Series flow of weakened absorbent from the second stage concentrator C2 is from the sump 46 thereof via line 53 and through the enhancer-concentrator EC. The low pressure discharge of the metering device 14 is through line 52 and spray bar 50 to the heat transfer coil 27 of the second stage concentrator C2. Accordingly, the volume of refrigerant is enhanced for delivery into the evaporator E, and the absorbent solution is strengthened for delivery into the absorber A, each of these functions increasing the chilling capability of the system.

Figure 3:
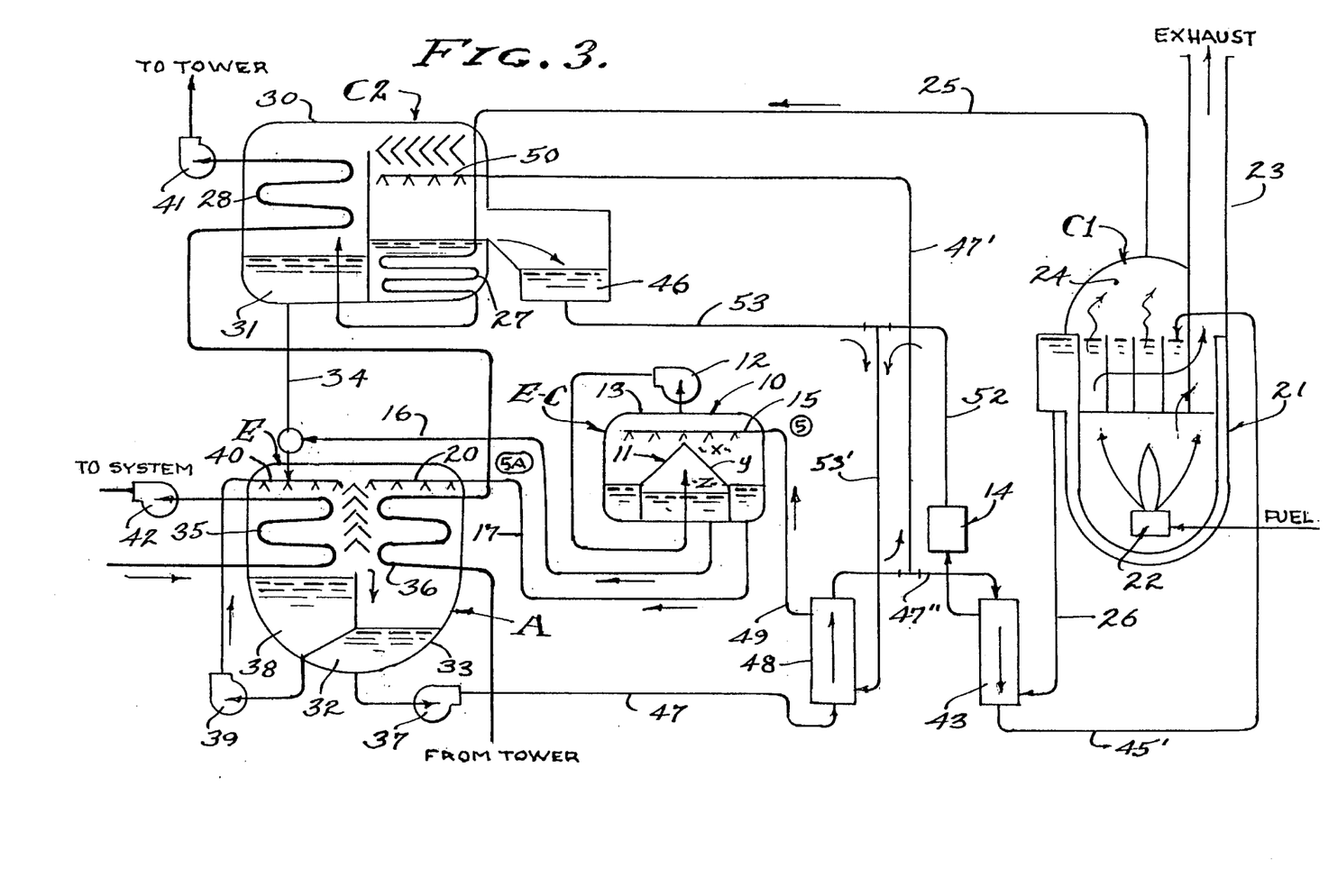
FIG. 3 is a schematic diagram of a parallel flow direct chilled absorption system and the enhancer-concentrator combined therein to improve the condition of the refrigerant and the absorbent.

Referring now to the parallel flow embodiment disclosed in FIG.3 of the drawings, the absorption cycle begins when high temperature high pressure reconcentrated absorbent solution from the first stage concentrator C1 flows through the metering device 14 and then discharged by spray bar 20 into the low pressure evaporator-absorber E-A vessel 33. The lower pressure causes boiling of the refrigerant water from the absorbent, by "flashing" into vapor that cools the liquid solution mass. The warmer system water is pumped through coil 35 causing more refrigerant to vaporize, and the remaining refrigerant is collected in the sump 38 and recirculated over coil 35 by spray bar 41 to thereby evaporate more refrigerant. High temperature high pressure reconcentrated absorbent solution from the first stage concentrator C1 is delivered to the metering device 14 through a high temperature heat exchanger 43 that transfers heat into the return of weakened absorbent solution recycled by pump 37 through line 47 and low temperature heat exchanger 48 to further reduce the temperature of the low pressure solution released by the metering device 14, and it is this low temperature low pressure strong absorbent solution that is delivered through the enhancer-concentrator EC and to the evaporator-absorber ETA via lines 49 and 17. Line 49 discharges into the vessel 13 through the spray bar 15. And a continuing line 47" through the heat exchangers 48 and 43 discharges weakened absorbent solution pre-heated thereby into the header 24 of the concentrator C1 via the line 45'. Heat transfer coil 27 of the second stage concentrator C2 is supplied with relatively cool weakened absorbent solution from line 47" from the low temperature heat exchanger 48 via line 47' and through the spray bar 50. Parallel flow of strong absorbent solution from the first stage concentrator C1 is from the metering device 14 and of strengthened absorbent solution from the second stage concentrator C2 sump 46 via line 53 joined with line 52 and continuing as line 53' to the heat exchanger 48. The combined absorbent solutions of the two concentrators C1 and C2 is directed through the enchancer-concentrator EC to the spray bar 20 of the evaporator-absorber E-A. Accordingly, the volume of refrigerant is enhanced for delivery into the evaporator E, and the absorbent solution is strengthened for delivery into the absorber A, each of these functions increasing the chilling capability of the system.

Figure 4:
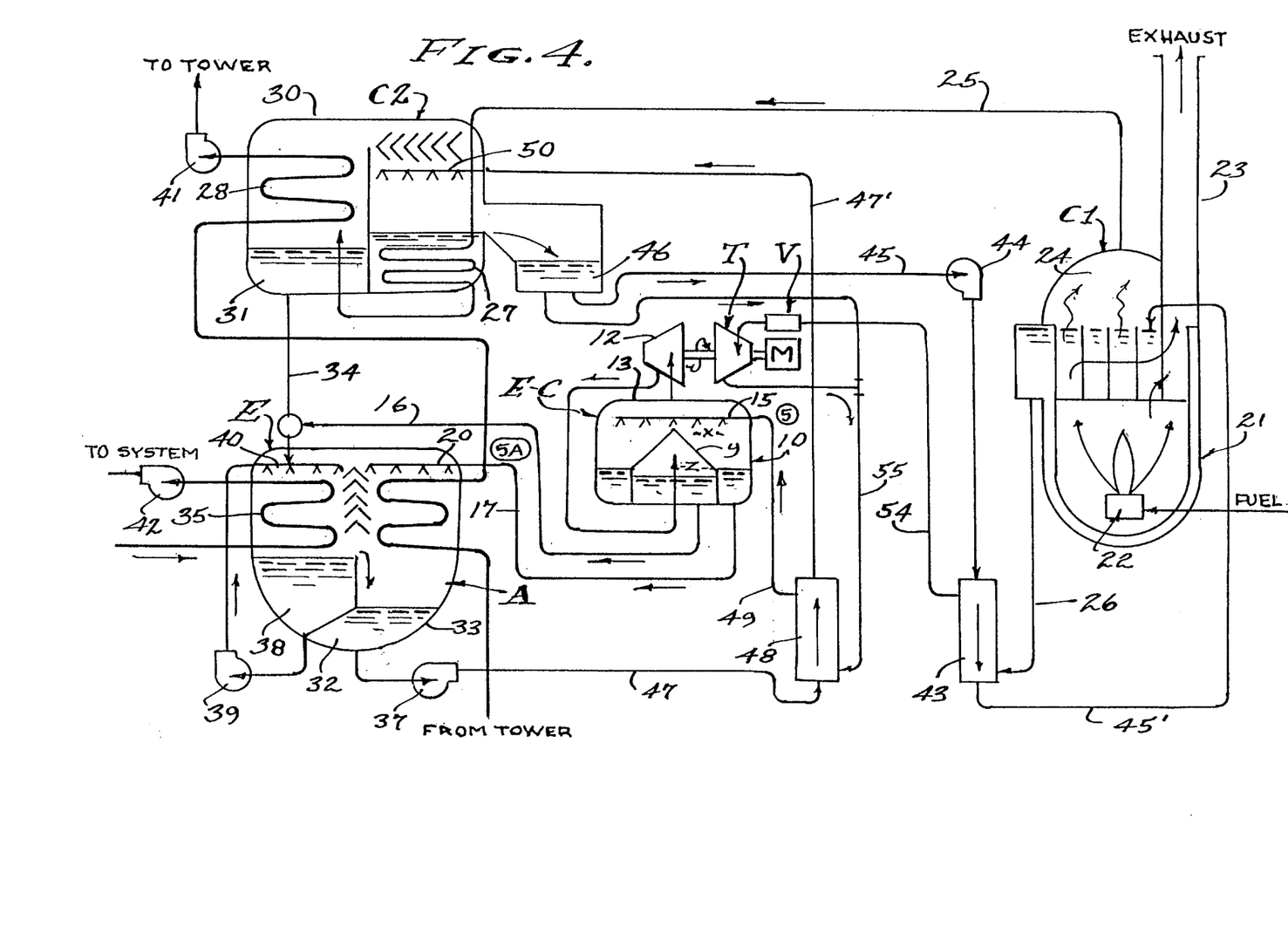
FIG. 4 is a schematic diagram of a reverse flow direct chilled absorption system and the enhancer-concentrator operated by a turbo-blower, compressor combined with the system to improve the condition of the refrigerant and the absorbent.

Referring now to the turbo-blower compressor and enhancer-concentrator embodiment disclosed in FIG. 4 of the drawings, any one of the previously described embodiments can be combined therewith. As shown, a reverse flow embodiment is combined with the enhancer-concentrator EC, and the pump 12 is driven by a turbine T. The absorption cycle begins when high temperature high pressure reconcentrated absorbent solution from the first stage concentrator C1 flows through the turbine T and is discharged by spray bar 20 into the lower pressure evaporator-absorber EA vessel 33. The turbine T is an energy recovery device which can replace the hereinabove described metering device 14, and it serves a dual purpose of prime mover and pressure reducer. In practice, the turbine T is a liquid driven motor assisted impulse turbine used in series following a control valve V or the like. There is a reduction in pressure as the concentrated absorbent solution flows through the turbine T from the high temperature heat exchanger 43 to the low temperature heat exchanger 48, while it powers the turbine T. The reverse flow system of the FIG. 4 embodiment is the same as the hereinabove described FIG. 1 embodiment except for the pressure line 54 from the high temperature heat exchanger 43 to the pressure reducing valve V (or metering device 14), and the lower pressure exhaust line 55 from the turbine T to the low temperature heat exchanger 48. Accordingly, the blower compressor 12 of the enhancer-concentrator EC is driven by the energy recovery operation of the turbine T, the volume of refrigerant is enhanced for delivery into the evaporator E, and the absorbent solution is strengthened for delivery into the absorber A, each of these functions increasing the chilling capability.

Since the heat of compression is recovered as latent heat of evaporation this process conducted in the enhancer-concentrator EC operates essentially as a heat pump using the refrigerant water vapor generated as both the heat transfer media and as a source of condensate calculating between the upper chamber x and the lower chamber z, thereby increasing the refrigeration effect, and the evaporator-absorber E-A by virtue of both the increased amount of water refrigerant available at the spray bar 40 and a higher concentration of absorbent solution at the spray bar 20.

The analysis expressed as follows is based upon a typical direct fired double effect absorption chiller that delivers a 63% Lithium-Bromide water solution at 121° F. and 1.7424 p.s.i. at line 49–17. This absorbent solution has been sprayed directly into the absorber A by line 17, whereas the enhancer-concentrator EC is now inserted between line 49 and 17 so as to increase the absorbent solution concentration while increasing the avalable volume of refrigerant water sprayed into the evaporator E. The absorbent solution concentration is increased from 63.0% to 64.1%, while the volume of available refrigerant water is increased 1.1%. In practice, the amount of water absorbed for one unit of Lithium-Bromide salt is increased from 0.119 to 0.146 resulting in an approximate 23% increased cooling capacity. Also in practice, there is a thin-film heat exchange at the dome wall 11 that raises the vapor temperature in the upper chamber x, and that vapor is then compressed by the blower compressor 12 from 1.7424 p.s.i. to 1.9449 p.s.i. and raised to a temperature 4° to 8° F. higher than the vapor temperature in the upper chamber x. There is a 1.1% increase in absorbent solution concentration that increases absorption capability in addition to the aforesaid increase in refrigerant volume sprayed into the evaporator E. Therefore, for a given size of absorption chiller system, the chilling capacity is substantially increased, for example 23%.

Figure 5:
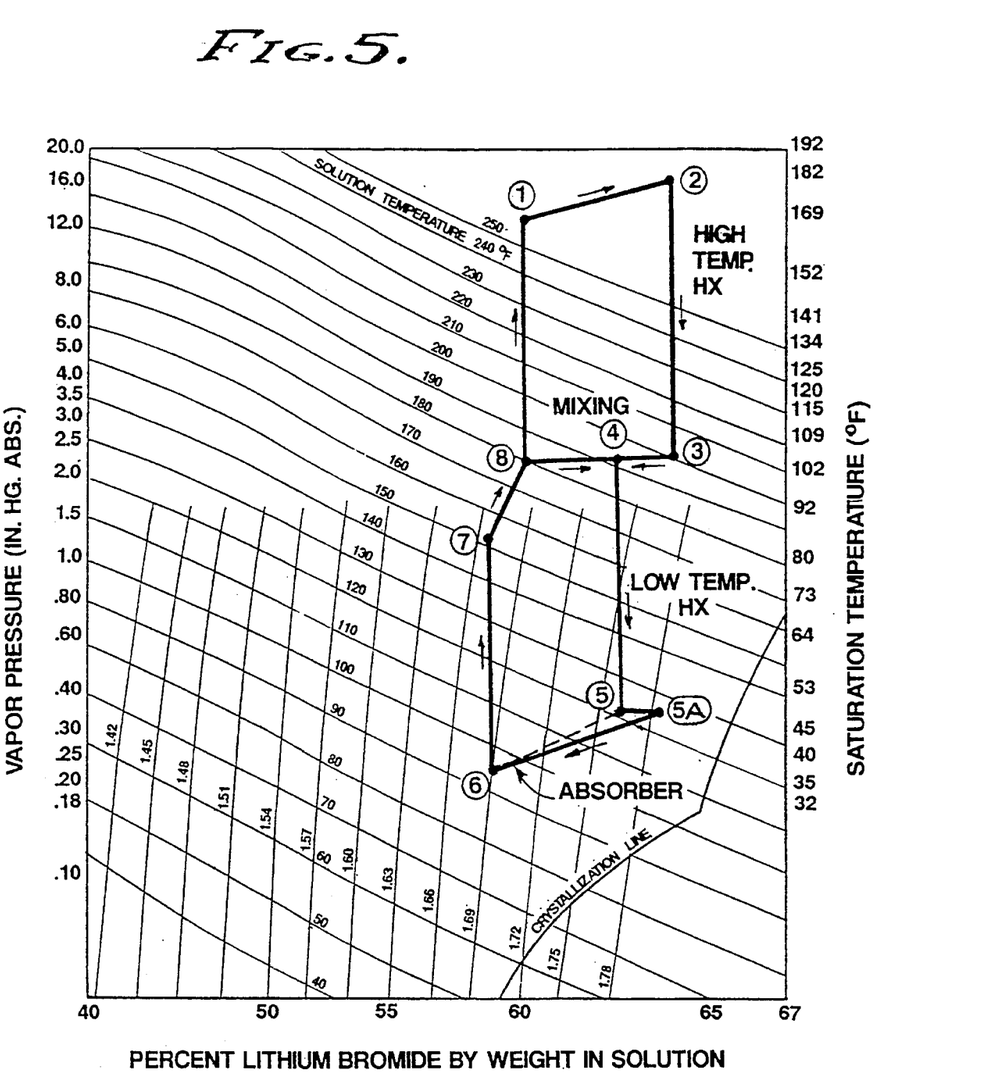
FIG. 5 is an equilibrium diagram for Lithium Bromide in the reverse flow system as it is illustrated in FIG. 1.

Referring now to the equilibrium diagram of FIG. 5 of the drawings, the encircled numerals 1 through 8 indicate the fluid conditions that occur when implementing the enhancer-concentrator EC in a reverse flow absorption chiller, as hereinabove disclosed and shown in FIG. 1 of the drawings. These numerals 1 through 8 are appropriately positioned on FIG. 1 of the drawings as they are related to the FIG. 5 diagram; numerals 1, 2, 3 and 8 forming a trapezoid that represents the functions involved with the high temperature heat exchanger 43; numerals 4, 5, 6, 7 and 8 forming a trapezium that represents the functions involved with the low temperature heat exchanger 48; and the numerals 5, 5A and 6 forming a triangle that represents the additional functions of the enhancer-concentrator.

The second stage refrigerant water is discharged through a metering device via line 34 and into the evaporator section E, where evaporation cools the liquid refrigerant. The transfer of heat from the warmer system water at coil 35 causes the refrigerant water to evaporate. The resulting water vapor moves into the absorber section A where it is absorbed by the Lithium-Bromide solution discharged at 20, the differential in water vapor-pressure between the absorbent solution and evaporating water refrigerant vapor driving the vapor into the absorbent solution. Absorption of the vapor releases the heat of vaporization that is picked up in the evaporator E. This heat with the heat of dilution produced as the refrigerant condensate mixed with the absorbent solution is transferred to the cooling tower via pump 41. The weak solution from sump 32 is pumped (37) to the second stage concentrator C2 where the addition of heat from the heat transfer coil 27 boils off the refrigerant water from the absorbent solution. The further weakened solution is returned by pump 44 to the first stage concentrator C1 through the high temperature heat exchanger 43 at 1 and heat applied by the burner means 22 which boils off water refrigerant thereby concentrating the Lithium-Bromide solution delivered by line 26. Strong absorbent solution is delivered at 5 and is processed by the enhancer-concentrator EC before discharge at 5A into the absorber A. This reprocessing of the previously concentrated 63.0% absorbent solution increases by reconcentration to 64.1% which increases its absorption capability 1.1%. Concurrently with said increased concentration of the absorbent solution, there is a 22.7% (nominal 23%) increase in the volume of water refrigerant discharged into the evaporator E, thereby increasing the chilling effect a nominal 23%. (The values given are nominal)

It is significant that there are two water refrigerant sources discharging into the evaporator E: one from the concentrator C2 via line 34; and another from the enhancer-concentrator EC via line 16. The discharge from lines 34 and 16 is through a metering device as indicated, and controlling the flow of refrigerant. Accordingly, the concentrated absorbent solution from line 49 is processed by means of evaporation and condensation by the enhancer-concentrator EC to strengthen the absorbent solution delivered by line 17 at 5A into absorber A. Whether a single or multistage absorption chiller is employed, this enhancer-concentrator EC is inserted into the concentrated absorbent line for added strengthening of the absorbent solution discharged into the absorber A, and for increased volume of water refrigerant discharged into the evaporator E. The result is a chilling capability increase of 23% above the same system operating without this enhancer-concentrator EC as hereinabove described.

Figure 6:
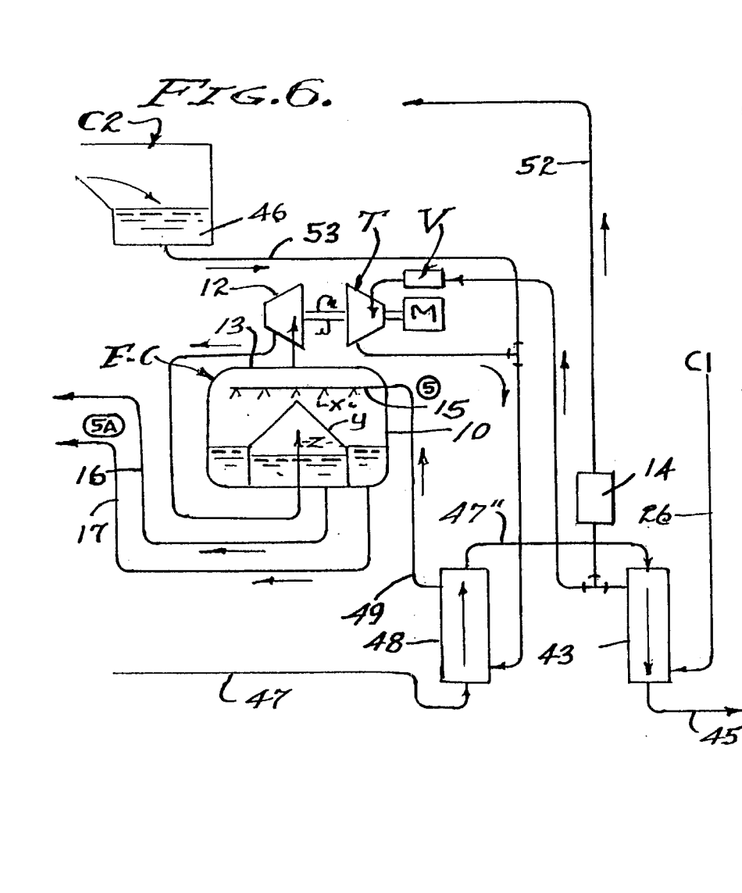
FIG. 6 is a fragmentary schematic diagram of the turbo-blower compressor combined with a series flow absorption chiller as shown in FIG. 2.
Figure 7:
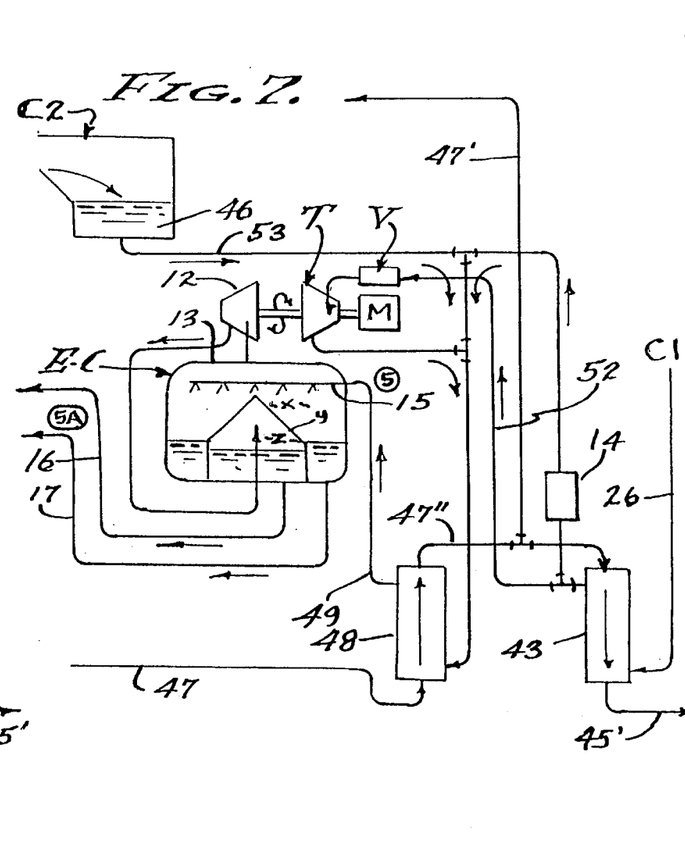
FIG. 7 is a fragmentary schematic diagram of the turbo-blower compressor combined with a parallel flow absorption chiller as shown in FIG. 3.
Figures 8, 9:
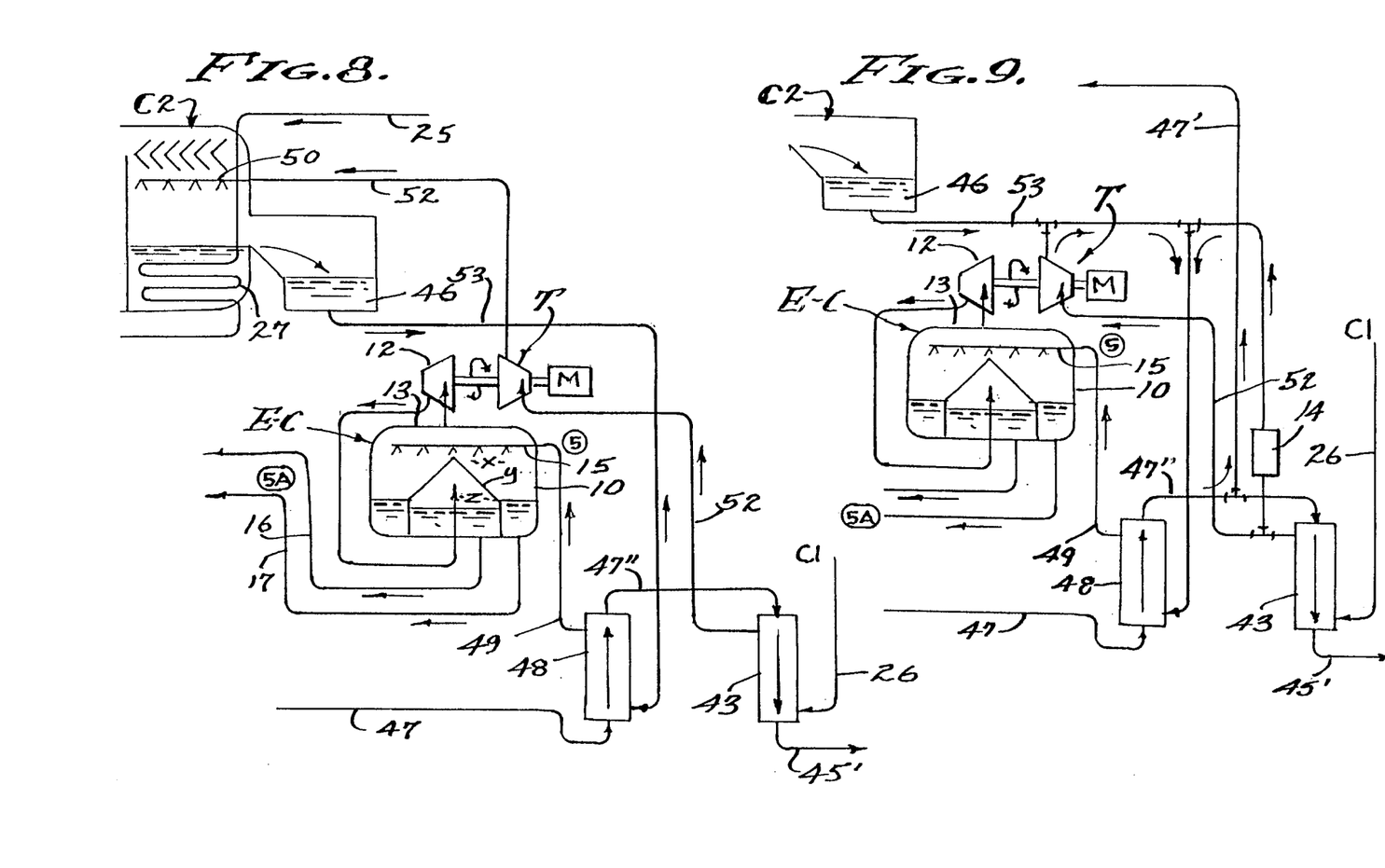
FIG. 8 is a fragmentary schematic diagram of the turbo-blower turbine operating as the solution flow metering means in a series flow absorption chiller.
FIG. 9 operating as the metering means in a parallel flow absorption chiller.

Referring to FIGS. 6 through 9, the turbo-blower compressor employs the pressure drop of absorbent solution for vapor compression of the concentrated absorbent to reconcentrate the same, by employing the enhancer-concentrator EC as disclosed herein. In FIGS. 6 and 7 the higher pressure liquid solution from heat exchanger 43 works through the turbine T and discharges from heat exchanger 48. In FIG. 8 the higher pressure liquid solution from heat exchanger 43 works through turbine T and discharges through line 52 into the evaporator A, and in FIG. 9 it discharges through heat exchanger 48 and into the enhancer-concentrator EC.

In accordance with this invention, the turbine T is motor assisted or resisted, there being a variable torque motor means M coupled thereto to accelerate or retard the turbine drive to the vapor compressor or blower pump 12. In practice, the torque of the motor means M is variable, whereby the flow of absorbent solution from the turbine is metered, thereby controlling the pressure drop of solution as is requried. Thus, a dual purpose is performed in the pressure drop and the recovery of kinetic energy that powers the turbine for operation of the enhancer-concentrator EC.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A refrigerant enhancer-absorbent concentrator in a closed system for increasing the chilling capacity of an absorption chiller comprised of at least one concentrator to which heat is applied to vaporize a water refrigerant and to concentrate an absorbent solution of said water refrigerant and absorbent material, having a condenser for cooling and liquefying said vaporized water refrigerant, having an evaporator for chilling said water refrigerant by means of evaporation, there being a heat-in coil from warmer system water that is chilled therein and which discharges heat to vaporize said water refrigerant, having an absorber for condensing the vaporized water refrigerant and for its absorption into the absorbent solution, there being a heat-out coil to pick up and discharge the heat of vaporization and the heat of dilution, and means returning the absorbent solution to the at least one concentrator for recycling through said closed system, the refrigerant enhancer-absorbent concentrator including, an evaporator means for vaporizing water refrigerant from the absorbent solution of water refrigerant and sorbent material from said at least one concentrator and for strengthening the absorbent solution discharged into the absorber of the closed system for additional absorption of water vapor therein, a vapor compressor means for pressurizing refrigerant vapor from the evaporator means, and condenser means for liquifying the water refrigerant vapor pressurized by the vapor compressor means for discharge of additional water refrigerant into the first mentioned evaporator of the closed system, whereby the chilling effect applied to the system water is increased.

2. The refrigerant enhancer-absorbent concentrator as set forth in claim 1, wherein the absorbent material is a Lithium-Bromide salt.

3. The refrigerant enhancer-absorbent concentrator as set forth in claim 1, wherein the absorbent material is a Lithium-Bromide salt, and wherein the concentration of the absorbent solution from the at least one concentrator is a nominal 63.0% and the concentration thereof from the evaporator means is a nominal 64.1%, the volume of water refrigerant from the condenser means being increased commensurate with a nominal 1.1% increase in absorbent solution concentration, whereby the volume of water refrigerant and resulting chilling effect is increased a nominal 23%.

4. The refrigerant enhancer-absorbent concentrator as set forth in claim 1, wherein the evaporator means and condenser means are separated by a heat transfer wall transferring the heat of compression of the compressor means from the condenser means to the evaporator means.

5. The refrigerant enhancer-absorbent concentrator as set forth in claim 1, wherein the absorbent solution of water refrigerant and absorbent material from said at least one concentrator is discharged into a closed chamber of the evaporator means for vaporization and collection of strengthened absorbent solution in a sump thereof for discharge into the absorber of the closed system.

6. The refrigerant enhancer-absorbent concentrator as set forth in claim 1, wherein the compressed water refrigerant vapor from the vapor compressor means is discharged into a closed chamber of the condenser means above a sump therein for liquification and collection of water refrigerant for discharge into the evaporator of the closed system.

7. The refrigerant enhancer-absorbent concentrator as set forth in claim 1, wherein the absorbent solution of water refrigerant and absorbent material from said at least one concentrator is discharged into a closed chamber of the evaporator means for vaporization and collection of strengthened absorbent solution in a sump thereof for discharge into the absorber of the closed system, and wherein the compressed water refrigerant vapor from the vapor compressor means is discharged into a closed chamber of the condenser means above a sump therein for liquification and collection of water refrigerant for discharge into the evaporator of the closed system, there being a heat transfer wall separating the chamber of the evaporator means and transferring the heat of compression of the vapor compression means from the condenser means to the evaporator means.

8. The refrigerant enhancer-absorbent concentrator as set forth in claim 1, wherein the compressor means for pressurizing the refrigerant vapor from the evaporator means is a turbo-blower compressor operating by means of a pressure drop in the absorbent solution from the at least one concentrator to the absorber of the closed system.

9. The refrigerant enhancer-absorbent concentrator as set forth in claim 1, wherein the compressor means for pressurizing the refrigerant vapor from the evaporator means is an impulse turbine-blower compressor operating by means of a liquid pressure drop in the absorbent solution from the at least one concentrator to the absorber of the closed system.

10. The refrigerant enhancer-absorbent concentrator as set forth in claim 1, wherein the compressor means is a fluid flow metering turbine having a high pressure inlet from the at least one concentrator and a low pressure discharge for controlling pressure drop in the absorbent solution from the at least one concentrator to the absorber of the closed system, driving a blower compressor pressurizing the refrigerant vapor from the evaporator means.

11. The refrigerant enhancer-absorbent concentrator as set forth in claim 10, wherein the turbine is assisted or resisted by a variable torque motor means for controlling metering of the absorbent solution.

12. The refrigerant enhancer-absorbent concentrator as set forth in claim 1, wherein the evaporator means and condenser means are embodied in a common vessel with separate closed vapor chambers and sumps for each, wherein the absorbent solution of water refrigerant and absorbent material from said at least one concentrator is discharged into the closed chamber of the evaporator means for vaporization and collection of strengthened absorbent solution in the sump thereof for discharge into the absorber of the closed system, and wherein the compressed water refrigerant vapor from the vapor compressor means is discharged into the closed chamber of the condenser means above a sump therein for liquification and collection of water refrigerant for discharge into the evaporator of the closed system, there being a heat transfer wall separating the separate closed chambers of the evaporator means and condenser means and transferring the heat of compression of the vapor compress ion means from the condenser means to the evaporator means.

13. A refrigerant enhancer-absorbent concentrator in a closed system for increasing the chilling capacity of a double effect reverse flow absorption chiller comprised of a first stage concentrator to which heat is applied to vaporize a water refrigerant and to concentrate an absorbent solution of said water refrigerant and a sorbent material, having a high temperature heat exchanger in a return line of weakened absorbent solution to said first stage concentrator and transferring heat of a strengthened absorbent solution concentrated by said first stage concentrator and into said return line of weakened absorbent solution, having a second stage concentrator with a condenser vapor chamber and sump for cooling and liquifying said vaporized water refrigerant, having an evaporator with a vapor chamber for chilling said water refrigerant by means of evaporation, having a low temperature heat exchanger in a line of the second stage absorbent solution joined by the first stage absorbent solution and transferring heat therefrom and into a return line of weakened absorbent solution and discharging into said evaporator vapor chamber, there being a heat-in coil from warmer system water that is chilled in said evaporator vapor chamber and which discharges heat to vaporize said water refrigerant, having an absorber for reducing water vapor pressure and with a vapor chamber and sump for water vapor absorption into the absorbent solution, there being a first heat-out coil in the absorber vapor chamber to pick up and discharge the heat of dilution, there being a second heat-out coil in the second stage concentrator and in series with said first heat-out coil to pick up and discharge the heat of condensation from the first stage concentrator, and means returning the absorbent solution from the absorber sump and through said return line and to the first stage concentrator for recycling through said closed system, the refrigerant enhancer-absorbent concentrator including, an evaporator means for vaporizing water from the absorbent solution of water refrigerant and sorbent material from said low temperature heat exchanger and for strengthening the absorbent solution discharged into the absorber of the closed system for additional absorption of water vapor therein, a vapor compressor means for pressurizing refrigerant vapor from the evaporator means, and condenser means for liquifying the water refrigerant vapor pressurized by the vapor compressor means for discharge of additional water refrigerant into the first mentioned evaporator of the closed system, whereby the chilling effect applied to the system water is increased.

14. The refrigerant enhancer-absorbent concentrator as set forth in claim 13, wherein the absorbent material is a Lithium-Bromide salt.

15. The refrigerant enhancer-absorbent concentrator as set forth in claim 13, wherein the absorbent material is a Lithium-Bromide salt, and wherein the concentration of the absorbent solution from the low temperature heat exchanger is a nominal 63.0% and the concentration thereof from the evaporator means is a nominal 64.1%, the volume of water refrigerant from the condenser means being increased commensurately with the 1.1% increase in absorbent solution concentration, whereby the volume of water refrigerant and resulting chilling effect is increased a nominal 23%.

16. The refrigerant enhancer-absorbent concentrator as set forth in claim 13, wherein the evaporator means and condenser means are separated by a heat transfer wall transferring the heat of compression of the compressor means from the condenser means to the evaporator means.

17. The refrigerant enhancer-absorbent concentrator as set forth in claim 13, wherein the absorbent solution of water refrigerant and absorbent material from said low temperature heat exchanger is discharged into a closed chamber of the evaporator means for vaporization and collection of strengthened absorbent solution in a sump thereof for discharge into the absorber of the closed system.

18. The refrigerant enhancer-absorbent concentrator as set forth in claim 13, wherein the compressed water refrigerant vapor from the vapor compressor means is discharged into a closed chamber of the condenser means above a sump therein for liquification and collection of water refrigerant for discharge into the evaporator of the closed system.

19. The refrigerant enhancer-absorbent concentrator as set forth in claim 13, wherein the absorbent solution of water refrigerant and absorbent material from said low temperature heat exchanger is discharged into a closed chamber of the evaporator means for vaporization and collection of strengthened absorbent solution in a sump thereof for discharge into the absorber of the closed system, and wherein the compressed water refrigerant vapor from the vapor compressor means is discharged into a closed chamber of the condenser means above a sump therein for liquification and collection of water refrigerant for discharge into the evaporator of the closed system, there being a heat transfer wall separating the chamber of the evaporator means and transferring the heat of compression of the vapor compression means from the condenser means to the evaporator means.

20. The refrigerant enhancer-absorbent concentrator as set forth in claim 13, wherein the compressor means for pressurizing the refrigerant vapor from the evaporator means is a turbo-blower compressor operating my means of a pressure drop in the absorbent solution from the high temperature heat exchanger to the absorber of the closed system.

21. The refrigerant enhancer-absorbent concentrator as set forth in claim 13, wherein the compressor means for pressurizing the refrigerant vapor from the evaporator means is an impulse turbine compressor operating by means of a liquid pressure drop in the absorbent solution from the high temperature heat exchanger to the absorber of the closed system.

22. The refrigerant enhancer-absorbent concentrator as set forth in claim 13, wherein the compressor means is a fluid flow metering turbine having a high pressure inlet from the high temperature heat exchanger and a low pressure discharge to the absorber of the closed system for controlling pressure drop in the absorbent solution from the high temperature heat exchanger to said absorber, driving a blower compressor pressurizing the refrigerant vapor from the evaporator means.

23. The refrigerant enhancer-absorbent concentrator as set forth in claim 22, wherein the turbine is assisted or resisted by a variable torque motor means for controlling metering of the absorbent solution.

24. The refrigerant enhancer-absorbent concentrator as set forth in claim 13, wherein the evaporator means and condenser means are embodied in a common vessel with separate closed vapor chambers and sumps for each, wherein the absorbent solution of water refrigerant and absorbent material from said low temperature heat exchanger is discharged into the closed chamber of the evaporator means for vaporization and collection of strengthened absorbent solution in the sump thereof for discharge into the absorber of the closed system, and wherein the compressed water refrigerant vapor from the vapor compressor means is discharged into the closed chamber of the condenser means above the sump therein for liquification and collection of water refrigerant for discharge into the evaporator of the closed system, there being a heat transfer wall separating the separate closed chambers of the evaporator means and condenser means and transferring the heat of compression of the vapor compression means from the condenser means to the evaporator means.

25. A refrigerant enhancer-absorbent concentrator in a closed system for increasing the chilling capacity of a double effect series flow absorption chiller comprised of a first stage concentrator to which heat is applied to vaporize a water refrigerant and to concentrate an absorbent solution of said water refrigerant and a sorbent material, having a high temperature heat exchanger in a return line of weakened absorbent solution to said first stage concentrator and transferring heat of a strengthened absorbent solution concentrated by said first stage concentrator and into said return line of weakened absorbent solution, having a second stage concentrator with a condenser vapor chamber and sump for cooling and liquifying said vaporized water refrigerant, having an evaporator with a vapor chamber for chilling said water refrigerant by means of evaporation, having a low temperature heat exchanger in a series line of the second stage absorbent solution and transferring heat therefrom and into a return line of weakened absorbent solution in a series line through said high temperature heat exchanger, there being s heat-in coil from warmer system water that is chilled in said evaporator vapor chamber and which discharges heat to vaporize said water refrigerant, having an absorber for reducing water vapor pressure and with a vapor chamber and sump for water vapor absorption into the absorbent solution, there being a first heat-out coil in the absorber vapor chamber to pick up and discharge the heat of dilution, there being a second heat-out coil in the second stage concentrator and in series with said first heat-out coil to pick up and discharge the heat of condensation from the first stage concentrator, and means returning the absorbent solution from the absorber sump and through said return line in series through the low and high temperature heat exchangers and to the first stage concentrator for recycling through said closed system, the refrigerant enhancer-absorbent concentrator including, an evaporator means for vaporizing water from the absorbent solution of water refrigerant and sorbent material from said low temperature heat exchanger and for strengthening the absorbent solution discharged into the absorber of the closed system for additional absorption of water vapor therein, a vapor compressor means for pressurizing refrigerant vapor from the evaporator means, and condenser means for liquifying the water refrigerant vapor pressurized by the vapor compressor means for discharge of additional water refrigerant into the first mentioned evaporator of the close system.

whereby the chilling effect applied to the system water is increased.

26. The refrigerant enhancer-absorbent concentrator as set forth in claim 25, wherein the absorbent material is a Lithium-Bromide salt.

27. The refrigerant enhancer-absorbent concentrator as set forth in claim 25, wherein the absorbent material is a Lithium-Bromide salt, and wherein the concentration of the absorbent solution from the low temperature heat exchanger is a nominal 63.0% and the concentration thereof from the evaporator means is a nominal 64.1%, the volume of water refrigerant from the condenser means being increased commensurately with the nominal 1.1% increase in absorbent solution concentration, whereby the volume of water refrigerant and resulting chilling effect is increased a nominal 23%.

28. The refrigerant enhancer-absorbent concentrator as set forth in claim 25, wherein the evaporator means and condenser means are separated by a heat transfer wall transferring the heat of compression of the compressor means from the condenser means to the evaporator means.

29. The refrigerant enhancer-absorbent concentrator as set forth in claim 25, wherein the absorbent solution of water refrigerant and absorbent material from said low temperature heat exchanger is discharged into a closed chamber of the evaporator means for vaporization and collection of strengthened absorbent solution in a sump thereof for discharge into the absorber of the closed system.

30. The refrigerant enhancer-absorbent concentrator as set forth in claim 25, wherein the compressed water refrigerant vapor from the vapor compressor means is discharged into a closed chamber of the condenser means above a sump therein for liquification and collection of water refrigerant for discharge into the evaporator of the closed system.

31. The refrigerant enhancer-absorbent concentrator as set forth in claim 25, wherein the absorbent solution of water refrigerant and absorbent material from said low temperature heat exchanger is discharged into a closed chamber of the evaporator means for vaporization and collection of strengthened absorbent solution in a sump thereof for discharge into the absorber of the closed system, and wherein the compressed water refrigerant vapor from the vapor compressor means is discharged into a closed chamber of the condenser means above a sump therein for liquification and collection of water refrigerant for discharge into the evaporator of the closed system, there being a heat transfer wall separating the chamber of the evaporator means and transferring the heat of compression of the vapor compression means from the condenser means to the evaporator means.

32. The refrigerant enhancer-absorbent concentrator as set forth in claim 25, wherein the compressor means for pressurizing the refrigerant vapor from the evaporator means is a turbo-blower compressor operating my means of a pressure drop in the absorbent solution from the high temperature heat exchanger to the absorber of the closed system.

33. The refrigerant enhancer-absorbent concentrator as set forth in claim 25, wherein the compressor means for pressurizing the refrigerant vapor from the evaporator means is an impulse turbine compressor operating by means of a liquid pressure drop in the absorbent solution from the high temperature heat exchanger to the absorber of the closed system.

34. The refrigerant enhancer-absorbent concentrator as set forth in claim 25, wherein the compressor means is a fluid flow metering turbine having a high pressure inlet from the high temperature heat exchanger and a low pressure discharge to the absorber of the closed system for controlling pressure drop in the absorbent solution from the at high temperature heat exchanger to said absorber, driving a blower compressor pressurizing the refrigerant vapor from the evaporator means.

35. The refrigerant enhancer-absorbent concentrator as set forth in claim 34, wherein the turbine is assisted or resisted by a variable torque motor means for controlling metering of the absorbent solution.

36. The refrigerant enhancer-absorbent concentrator as set forth in claim 25, wherein the evaporator means and condenser means are embodied in a common vessel with separate closed vapor chambers and sumps for each, wherein the absorbent solution of water refrigerant and absorbent material from said low temperature heat exchanger is discharged into the closed chamber of the evaporator means for vaporization and collection of strengthened absorbent solution in the sump thereof for discharge into the absorber of the closed system, and wherein the compressed water refrigerant vapor from the vapor compressor means is discharged into the closed chamber of the condenser means above the sump therein for liquification and collection of water refrigerant for discharge into the evaporator of the closed system, there being a heat transfer wall separating the separate closed chambers of the evaporator means and condenser means and transferring the heat of compression of the vapor compression means from the condenser means to the evaporator means.

37. A refrigerant enhancer-absorbent concentrator in a closed system for increasing the chilling capacity of a double effect parallel flow absorption chiller comprised of a first stage concentrator to which heat is applied to vaporize a water refrigerant and to concentrate an absorbent solution of said water refrigerant and a sorbent material, having a high temperature heat exchanger in a return line of weakened absorbent solution to said first stage concentrator and transferring heat of a strengthened absorbent solution concentrated by said first stage concentrator and into said return line of weakened absorbent solution, having a second stage concentrator with a condenser vapor chamber and sump for cooling and liquifying said vaporized water refrigerant, having an evaporator with a vapor chamber for chilling said water refrigerant by means of evaporation, having a low temperature heat exchanger in a parallel line of the second stage absorbent solution joined by a first stage absorbent solution and transferring heat therefrom and into the return line of weakened absorbent solution, there being s heat-in coil from warmer system water that is chilled in said evaporator vapor chamber and which discharges heat to vaporize said water refrigerant, having an absorber for reducing water vapor pressure and with a vapor chamber and sump for water vapor absorption into the absorbent solution, there being a first heat-out coil in the absorber vapor chamber to pick up and discharge the heat of dilution, there being a second heat-out coil in the second stage concentrator and in series with said first heat-out coil to pick up and discharge the heat of condensation from the first stage concentrator, and means returning the absorbent solution from the absorber sump and through said return line in series through the low and high temperature heat exchangers and to the first stage concentrator for recycling through said closed system, the refrigerant enhancer-absorbent concentrator including, an evaporator means for vaporizing water from the absorbent solution of water refrigerant and sorbent material from said low temperature heat exchanger and for strengthening the absorbent solution discharged into the absorber of the closed system for additional absorption of water vapor therein, a vapor compressor means for pressurizing refrigerant vapor from the evaporator means, and condenser means for liquifying the water refrigerant vapor pressurized by the vapor compressor means for discharge of additional water refrigerant into the first mentioned evaporator of the close system.

whereby the chilling effect applied to the system water is increased.

38. The refrigerant enhancer-absorbent concentrator as set forth in claim 37, wherein the absorbent material is a Lithium-Bromide salt.

39. The refrigerant enhancer-absorbent concentrator as set forth in claim 37, wherein the absorbent material is a Lithium-Bromide salt, and wherein the concentration of the absorbent solution from the low temperature heat exchanger is a nominal 63.0% and the concentration thereof from the evaporator means is a nominal 64.1%, the volume of water refrigerant from the condenser means being increased commensurately with the nominal 1.1% increase in absorbent solution concentration, whereby the volume of water refrigerant and resulting chilling effect is increased a nominal 23%.

40. The refrigerant enhancer-absorbent concentrator as set forth in claim 37, wherein the evaporator means and condenser means are separated by a heat transfer wall transferring the heat of compression of the compressor means from the condenser means to the evaporator means.

41. The refrigerant enhancer-absorbent concentrator as set forth in claim 37, wherein the absorbent solution of water refrigerant and absorbent material from said low temperature heat exchanger is discharged into a closed chamber of the evaporator means for vaporization and collection of strengthened absorbent solution in a sump thereof for discharge into the absorber of the closed system.

42. The refrigerant enhancer-absorbent concentrator as set forth in claim 37, wherein the compressed water refrigerant vapor from the vapor compressor means is discharged into a closed chamber of the condenser means above a sump therein for liquification and collection of water refrigerant for discharge into the evaporator of the closed system.

43. The refrigerant enhancer-absorbent concentrator as set forth in claim 37, wherein the absorbent solution of water refrigerant and absorbent material from said low temperature heat exchanger is discharged into a closed chamber of the evaporator means for vaporization and collection of strengthened absorbent solution in a sump thereof for discharge into the absorber of the closed system, and wherein the compressed water refrigerant vapor from the vapor compressor means is discharged into a closed chamber of the condenser means above a sump therein for liquification and collection of water refrigerant for discharge into the evaporator of the closed system, there being a heat transfer wall separating the chamber of the evaporator means and transferring the heat of compression of the vapor compression means from the condenser means to the evaporator means.

44. The refrigerant enhancer-absorbent concentrator as set forth in claim 37, wherein the compressor means for pressurizing the refrigerant vapor from the evaporator means is a turbo-blower compressor operating by means of a pressure drop in the absorbent solution from the high temperature heat exchanger to the absorber of the closed system.

45. The refrigerant enhancer-absorbent concentrator as set forth in claim 37, wherein the compressor means for pressurizing the refrigerant vapor from the evaporator means is an impulse turbine compressor operating by means of a liquid pressure drop in the absorbent solution from the high temperature heat exchanger to the absorber of the closed system.

46. The refrigerant enhancer-absorbent concentrator as set forth in claim 37, wherein the compressor means is a fluid flow metering turbine having a high pressure inlet from the high temperature heat exchanger and a low pressure discharge to the absorber of the closed system for controlling pressure drop in the absorbent solution from the at high temperature heat exchanger to said absorber, driving a blower compressor pressurizing the refrigerant vapor from the evaporator means.

47. The refrigerant enhancer-absorbent concentrator as set forth in claim 46, wherein the turbine is assisted or resisted by a variable torque motor means for controlling metering of the absorbent solution.

48. The refrigerant enhancer-absorbent concentrator as set forth in claim 37, wherein the evaporator means and condenser means are embodied in a common vessel with separate closed vapor chambers and sumps for each, wherein the absorbent solution of water refrigerant and absorbent material from said low temperature heat exchanger is discharged into the closed chamber of the evaporator means for vaporization and collection of strengthened absorbent solution in the sump thereof for discharge into the absorber of the closed system, and wherein the compressed water refrigerant vapor from the vapor compressor means is discharged into the closed chamber of the condenser means above the sump therein for liquification and collection of water refrigerant for discharge into the evaporator of the closed system, there being a heat transfer wall separating the separate closed chambers of the evaporator means and condenser means and transferring the heat of compression of the vapor compression means from the condenser means to the evaporator means.

\* \* \* \* \*